US007047997B2

(12) United States Patent
Beyer et al.

(10) Patent No.: US 7,047,997 B2
(45) Date of Patent: May 23, 2006

(54) FUEL TANK VENT VALVE

(75) Inventors: Sharon Elizabeth Beyer, Grand Blanc, MI (US); Ulf Sawert, Grand Blanc, MI (US); Mark K. Wolfenden, Burton, MI (US); Chris I. Witherspoon, Clarkston, MI (US); Robert A. Roth, Grand Blanc, MI (US); Thomas J. Mott, Highland, MI (US); Michael Allen Pittenger, Swartz Creek, MI (US); William L. Villaire, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/835,053

(22) Filed: Apr. 28, 2004

(65) Prior Publication Data
US 2005/0022869 A1  Feb. 3, 2005

Related U.S. Application Data

(60) Provisional application No. 60/491,656, filed on Jul. 29, 2003.

(51) Int. Cl.
*F16K 24/04* (2006.01)

(52) U.S. Cl. .................. 137/202; 137/43; 137/68.15

(58) Field of Classification Search ................ 137/2, 137/68.14, 68.15, 43, 202
See application file for complete search history.

(56) References Cited

U.S. PATENT DOCUMENTS

| 5,992,441 | A | * | 11/1999 | Enge et al. ............ 137/202 |
| 6,213,100 | B1 | | 4/2001 | Johansen |
| 6,216,671 | B1 | | 4/2001 | Sawert et al. |
| 6,247,458 | B1 | | 6/2001 | Heinemann et al. |
| 6,311,675 | B1 | | 11/2001 | Crary et al. |
| 6,367,650 | B1 | | 4/2002 | Kuehnemund et al. |
| 6,581,621 | B1 | | 6/2003 | Klaffki et al. |
| 6,810,913 | B1 | * | 11/2004 | Potter et al. ........... 137/202 |
| 2002/0017281 | A1 | | 2/2002 | Crary et al. |

* cited by examiner

*Primary Examiner*—Kevin Leo
(74) *Attorney, Agent, or Firm*—Jimmy L. Funke

(57) ABSTRACT

A device and method for venting a tank comprising an intermediate shutoff valve as part of a cover that closes a tank opening. The intermediate shutoff valve is placed between an existing valve and a vent port in a liquid storage tank. The shutoff valve is operable to substantially fluidly seal the vent port when the vent valve is displaced greater than a predetermined amount. The intermediate shutoff valve facilitates complete removal of the existing vent valve during an impact wherein a wall of the storage tank impacts the existing valve. Upon impact, the intermediate shutoff valve is operable to close and seal a tank opening created by the displacement and removal of the existing vent valve.

7 Claims, 3 Drawing Sheets

FUEL TANK VENT VALVE

REFERENCE TO A RELATED APPLICATION AND PRIORITY CLAIM

This application claims the benefit of Provisional Application No. 60/491,656, filed Jul. 29, 2003.

TECHNICAL FIELD

This invention pertains generally to a fuel storage system, and more specifically to a vent valve for a fuel storage system.

BACKGROUND OF THE INVENTION

In a fuel storage tank for a motor vehicle or other devices, a vent valve is used to permit flow of air into and out of the tank to accommodate change in the amount of fuel in the tank during refueling and ongoing consumption of fuel, as well as effects of changing ambient temperatures. Flow of air into and out of the fuel tank reduces risk of damage to the fuel tank caused by pressure changes that may be generated absent a vent valve. A modern fuel tank typically has a fill limiter vent valve to permit escape of fuel vapors from the tank during refueling, thus facilitating refueling. Fuel vapors are instead permitted to flow to an evaporative storage canister.

Vehicle manufacturers are concerned that liquid fuel may escape from the fuel tank through the fill limiter vent valve when the tank is on an incline, or when the tank is overturned, e.g. during an accident involving a rollover. Therefore, the fill limiter vent valve and other valves in the fuel storage tank typically include a secondary function of closing when liquid fuel is present at the valve. However, there is a concern that the fill limiter vent valve may become damaged and unable to seal properly against flow of liquid fuel as a result of an impact. This may result when an impact is severe enough to move the wall of the fuel tank into physical contact with a valve, restricting the valve's operation or damages the valve and limiting its ability to seal liquid fuel. Present fill limiter vent valves and other valves may be limited in their ability to adequately seal against flow of liquid fuel in event of such an impact.

SUMMARY OF THE INVENTION

The present invention provides an improvement over conventional valves inserted into a fuel storage tank in that it provides an intermediate shutoff valve between a vent housing for an existing valve, such as a fill level vent valve. The intermediate valve is normally opened by the engagement of the existing vent valve. The intermediate shutoff valve is designed to facilitate complete removal of the existing vent valve during an impact wherein a wall of the fuel tank impacts the existing valve. Upon impact, the intermediate shutoff valve is operable to close and seal a tank opening created by the complete removal of the existing vent valve. This invention describes an intermediate valving system for use in addition to an existing vent valve that is typically known in the industry. Typical valves include, for example, fill limiter vent valves and grade vent valves (i.e. rollover valves).

The present invention includes a device and method for venting a tank, comprising a cover which closes an opening in the tank and a vent port which passes through the cover. A vent valve is contained in the tank and in fluid communication with the vent port via the shutoff valve. The shutoff valve is operable to fluidly seal the vent port when the vent valve is displaced greater than a predetermined amount. The vent valve may be frangibly connected to the cover, such that the shutoff valve acts to fluidly seal the vent tube when the vent valve is displaced and mechanically fractured from the cover. The vent valve may instead be sealably connected to the cover, such that the shutoff valve acts to fluidly seal the vent tube when the vent valve is displaced and mechanically moved from the cover. The vent valve may comprise a rollover protection valve or a fill limiter vent valve. The shutoff valve may also act when the vent valve is subject to a force sufficient to substantially mechanically disconnect the vent valve from the cover, such as may happen upon impact.

Movement of a fuel tank sidewall may occur due to impact of the sidewall during an accident. This movement may be sufficient to cause the sidewall to strike the vent valve. In addition, other components of the modular reservoir assembly may strike the vent valve on impact, leading to the same result. The present invention permits the mounting flange of the vent valve to break free of the valve body of the intermediate valve. As the mounting flange breaks free of the valve body, the spring forces the valve disc to seal against the valve seat. This prevents any liquid fuel and vapor from escaping out of the vent port tube and ensures that a leak free interface is maintained. These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF EMBODIMENTS OF THE INVENTION

Figure 1:
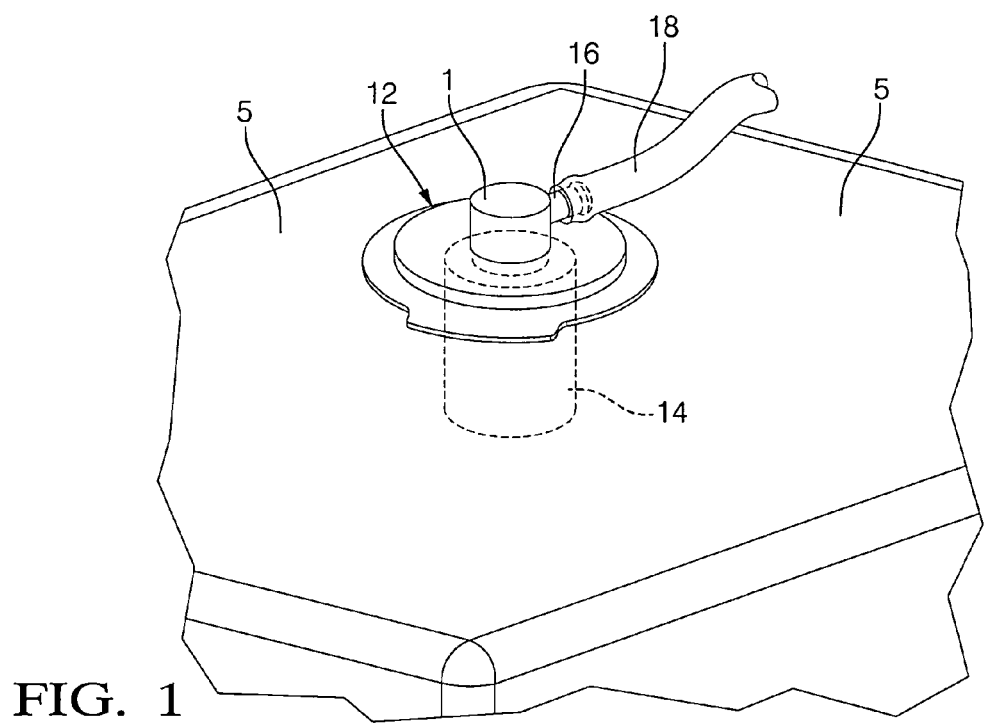
FIG. 1 is an overview schematic of a valve in a tank, in accordance with the present invention.
Figure 2:
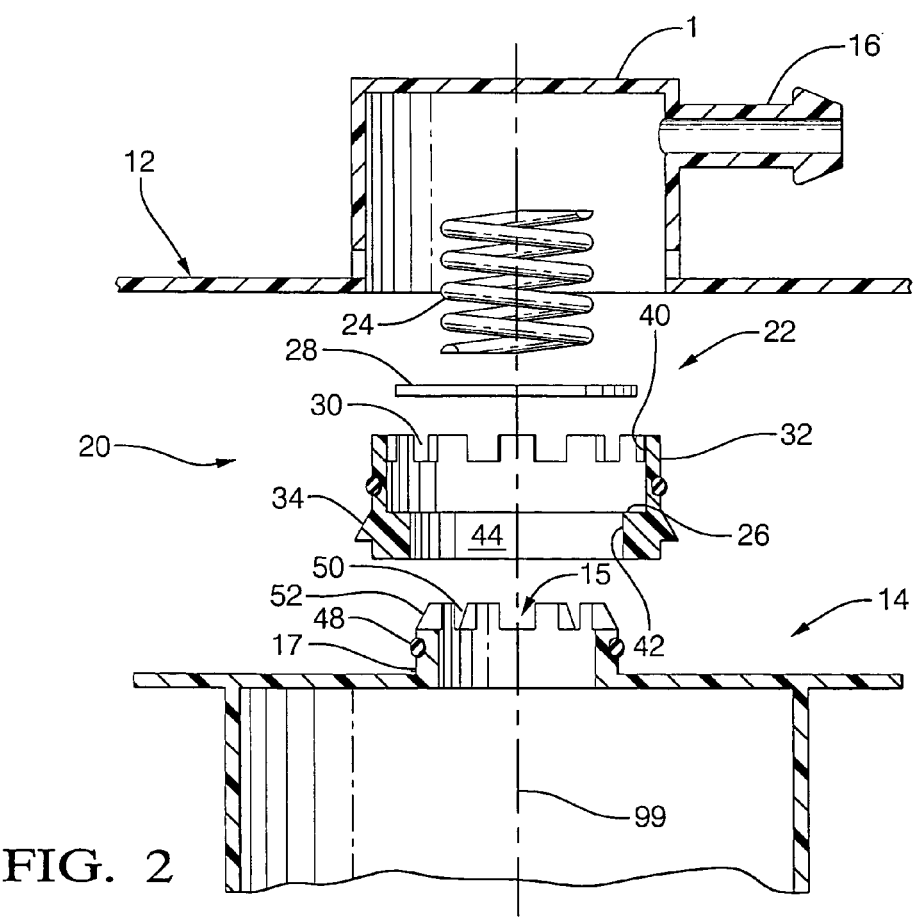
FIG. 2 is a schematic of a vent valve assembly in accordance with a first embodiment of the present invention.
Figure 3A:
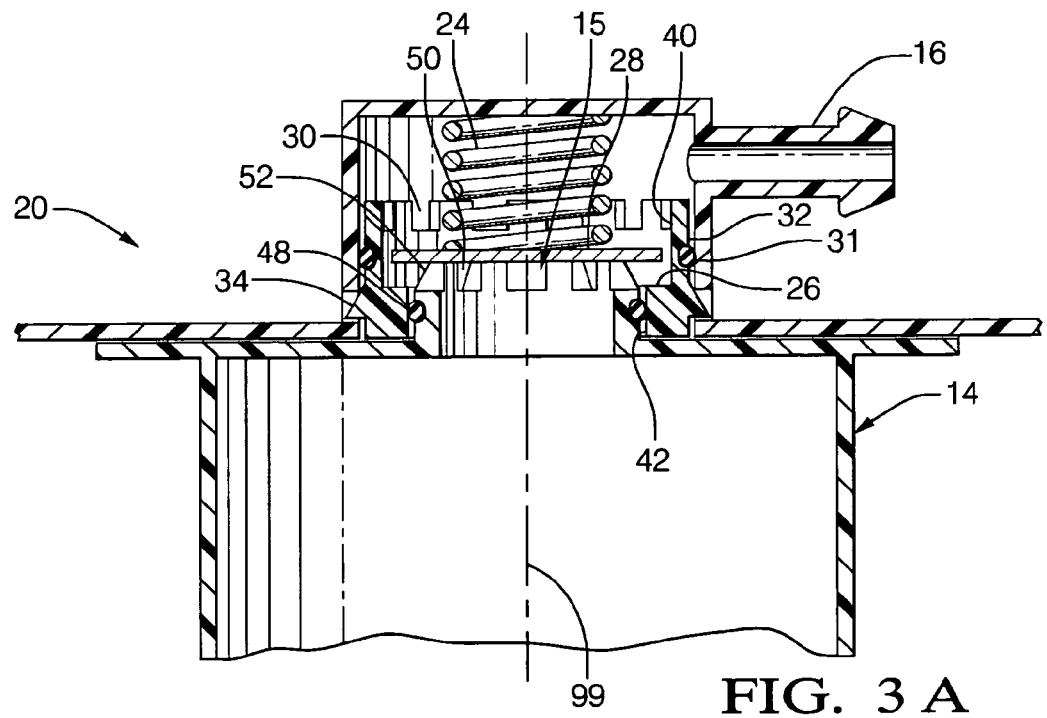
FIGS. 3A and 3B are further schematics of the vent valve assembly in accordance with the first embodiment of the present invention; and, FIGS. 4A and 4B are schematics of the vent valve assembly in accordance with a second embodiment of the present invention.
Figure 3B:
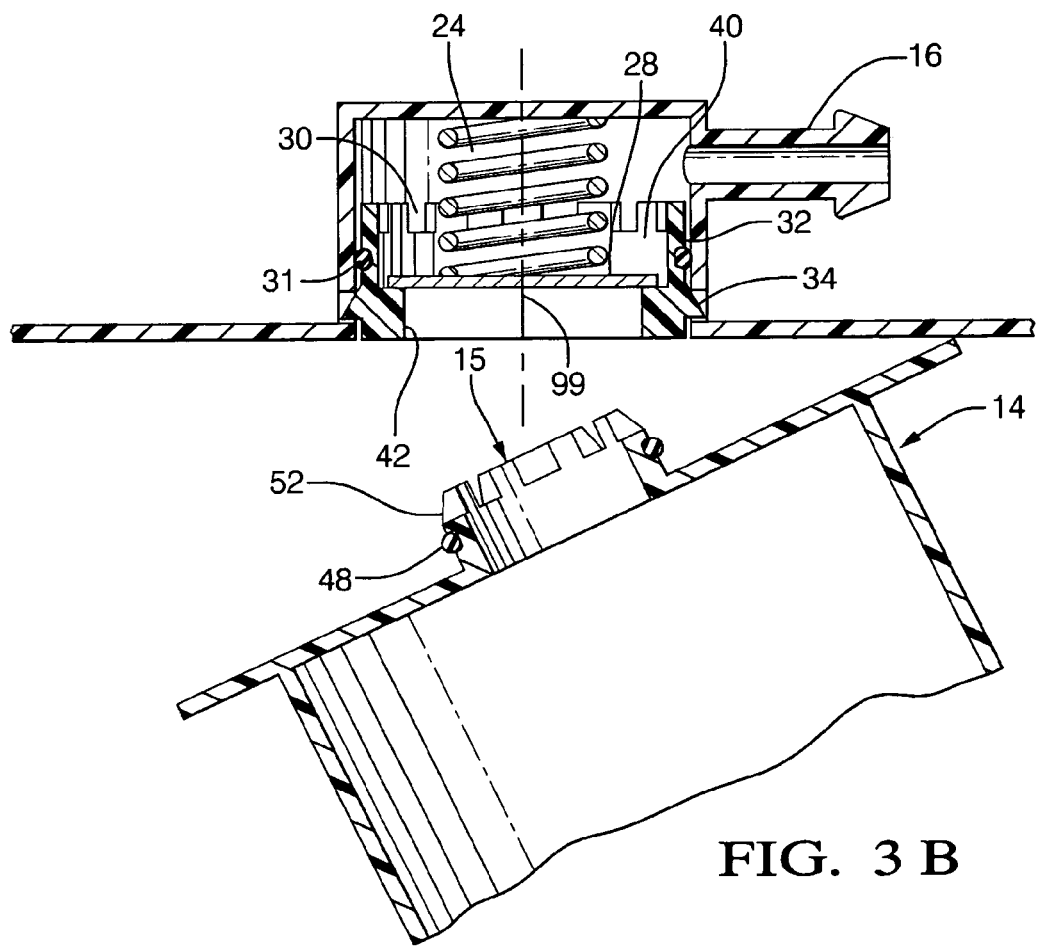
Figure 4:
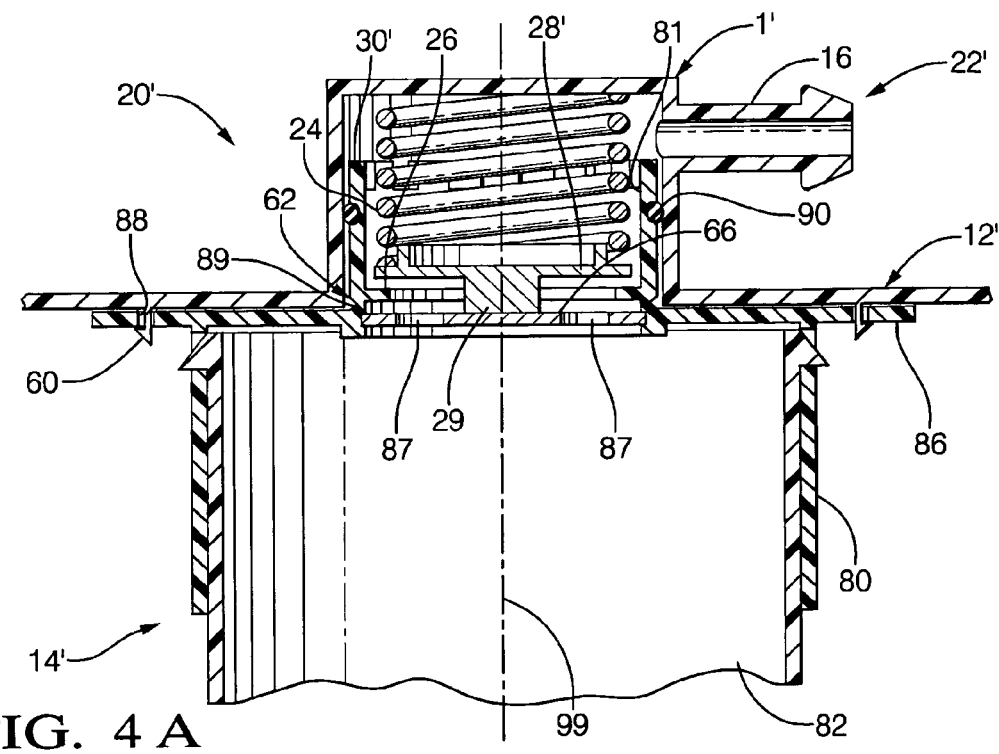
Figure 4:
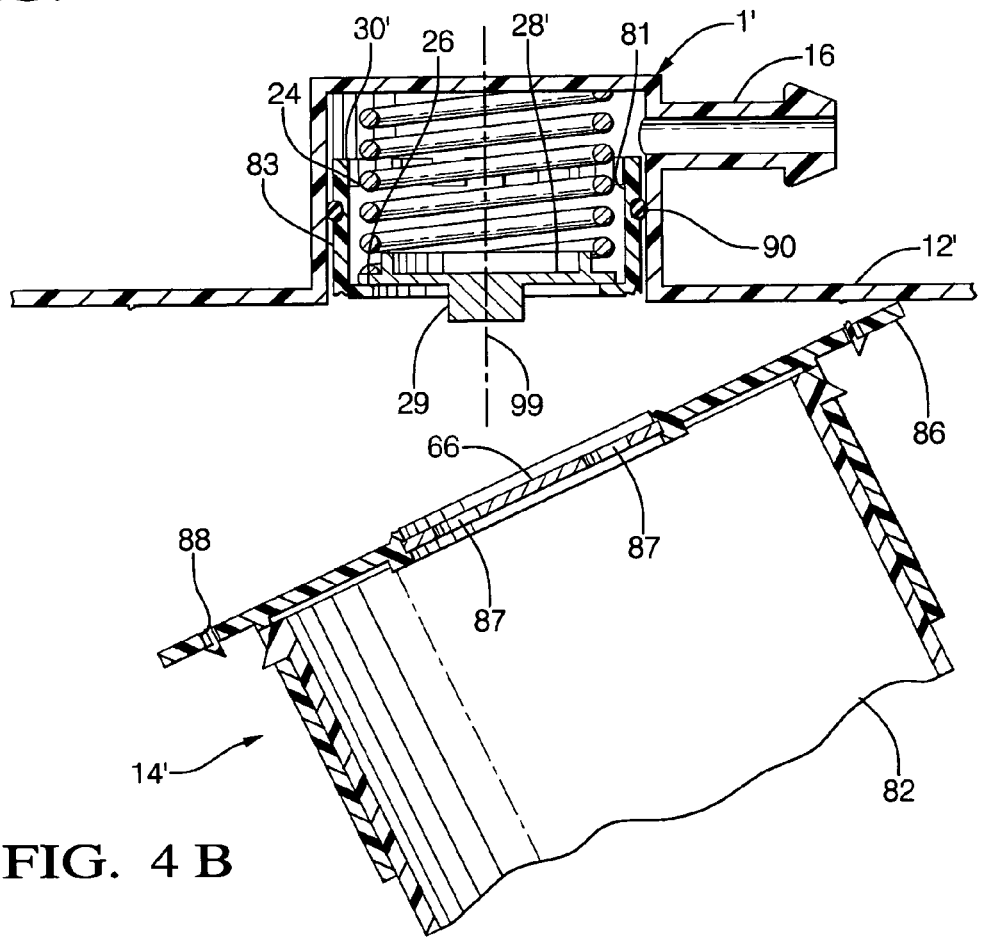

Referring now to the drawings, wherein the showings are for the purpose of illustrating the invention only and not for the purpose of limiting the same, FIG. 1 shows an overview of a vent valve assembly for use in a tank, FIGS. 2, 3A and 3B show a first embodiment of the vent valve assembly 20, and FIGS. 4A and 4B show a second embodiment of the vent valve assembly 20'. Each vent valve assembly 20, 20' has been constructed in accordance with an embodiment of the present invention. Each of the embodiments has been shown in application to a fuel tank on a motorized vehicle, although the invention described hereinafter is not necessarily limited to such an application.

Referring now to FIG. 1, an overview of the device as assembled in a tank 5 is shown. The tank 5 preferably comprises a storage tank for fuel or other fluid, wherein the tank 5 is ongoingly filled and drained of the fluid. The device comprises a cover 12 substantially closing an opening in the tank 5, a valve housing 1 that is preferably molded into the cover 12 containing a vent port 16 passing through the cover 12, a valve assembly (not shown) inserted into the valve housing 1 in fluid communication with the vent port 16, and, a vent valve 14 contained in the tank 5 and in fluid communication with the vent port 16 via the valve assembly (not shown). The vent port 16 is preferably fluidly connected to a tube 18 that is in fluid communication with a liquid trip, in this case an evaporative storage canister (not shown). The cover 12 in each of the embodiments preferably comprises a modular reservoir assembly (not shown in detail) that is interposed through the wall of fuel tank 5, and is sealably attached thereto. The modular reservoir assembly may be of a type described in Sawert, et al., U.S. Pat. No. 6,216,671, which is incorporated herein by reference. The cover 12 in this embodiment is preferably a rigid, substantially plate-shaped device formed of thermoplastic material, with openings for passage of fluids in and out of the tank 5 and mounting structures for attaching devices, including valve housing 1. The modular reservoir assembly is preferably mounted in the fuel tank 5 such that a main plane of the cover 12 is in a horizontal orientation when the tank 5 is normally situated. The vent valve assembly 20 is preferably assembled into the cover 12 such that a longitudinal axis 99 of the vent valve assembly 20 is vertical and perpendicular to the main plane of the cover 12.

Referring now to FIGS. 2 and 3A, a first embodiment of the vent valve assembly 20 is shown. The first embodiment of the device for venting tank 5, comprises cover 12 substantially closing the opening in the tank 5, valve housing 1 that is preferably molded into the cover 12 containing vent port 16 passing through the cover 12, and a vent valve assembly 20 assembled thereto. The vent valve assembly comprises the shutoff valve 22 and the vent valve 14. The shutoff valve 22 is inserted into the valve housing 1 and is in fluid communication with the vent port 16 and vent valve 14 contained in the tank. The vent valve 14 is in fluid communication with the vent port 16 via the shutoff valve 22. The shutoff valve 22 is operable to substantially fluidly seal the vent port 16 when the vent valve 14 is displaced greater than a predetermined amount, when the vent valve 14 is displaced an amount sufficient to mechanically disconnect the vent valve from the cover 12, or when the vent valve 14 is subject to a force greater than a predetermined force.

Referring again to FIGS. 2 and 3A, the vent valve assembly 20 of the first embodiment comprises the vent valve 14 in fluid communication with the shutoff valve 22. The shutoff valve 22 is in fluid communication with the vent port 16 that is an element of the vent housing 1. The vent port 16 is fluidly connected to an external vent tube 18. The external vent tube 18 is preferably fluidly connected to the remotely mounted evaporative storage canister (not shown), which is operable to capture and store at least a portion of fuel vapors that escape from the fuel tank 5. Under normal operation, air and fuel vapors flow from the fuel tank 5 through the vent valve 14, through the shutoff valve 22 and to the vent tube 16 when pressure within the fuel tank 5 exceeds pressure within the vent tube and evaporative canister. Evaporative storage canisters (not shown) are known to one skilled in the art.

The vent valve 14 in this embodiment comprises a conventional fill limiter vent valve modified to attach to the shutoff valve 22 and permit flow of vapor through the shutoff valve 22 to the aforementioned evaporative canister. Fill limiter vent valves are known to one skilled in the art. The vent valve 14 provides functions in the fuel storage system related to prevention of tank overfilling during refueling. The vent valve 14 may instead provide functions in the fuel storage system related to preventing fuel spillage resulting from excessive grade of a fuel tank, typically referred to as a rollover valve. Rollover valves are known to one skilled in the art.

In accordance with this invention, vent valve has an opening and a neck 17 disposed about the opening. Neck 17 is designed to be sealably inserted into valve body 32 of the shutoff valve 22, and includes an end 15, an o-ring seal 48, and a plurality of vent windows 50. The first end includes a molded taper 52 which is preferably at an angle near 45 degrees, to assist insertion into the shutoff valve 22 and to assist displacement of the vent valve 14 under conditions described hereinafter. When the vent valve 14 is inserted into the shutoff valve 22, end 15 of the vent valve 14 physically engages a disc valve 28 of the shutoff valve 22, displacing the disc valve 28 and forcing open the shutoff valve 22, thus compressing a spring 24 contained within the shutoff valve 22 and engaged against the disc valve 28. The o-ring seal 48 creates a fluid seal between the shutoff valve 22 and the vent valve 14, such that fluid and vapors flow into the vent valve 14, through the vent windows 50 of the vent valve 14, past the displaced disc valve 28, through a plurality of vent windows 30 of the shutoff valve 22, through the vent housing 1 and out the vent port 16 to the canister (not shown).

The shutoff valve 22 of this embodiment comprises the valve body 32 with a valve seat 26, the disc valve 28, the compression spring 24, the plurality of vent windows 30, and a plurality of retention devices 34. The valve body 32 is preferably a tubular-shaped device formed of thermoplastic material, and preferably includes a passage 44 having a substantially circular cross-sectional opening concentric to the longitudinal axis 99 of the vent valve assembly 20 when assembled thereto. The outer diameter of the valve body 32 is designed to be slightly less than an inner diameter of the vent housing 1 wherein the valve body 32 is inserted into the vent housing 1. The plurality of vent windows 30 are preferably molded into an end of the valve body 32 to facilitate fluid communication between the valve body 32 and the vent port 16. The plurality of retention devices 34 of the valve body 32 preferably interferes with inner wall of the vent housing 1, and acts in concert with o-ring 31 to hold the valve body 32 securely in the vent housing 1 when the valve body is inserted therein. The plurality of retention devices 34 and o-ring 31 are further operable to create a fluid seal between the vent housing 1 and the valve body 32, thus preventing fluid leakage between the inner wall of the vent housing 1 and the outer wall of the valve body 32. There is a first inner diameter 40 and a second inner diameter 42 of the valve body 32. The first inner diameter 40 of the valve body 32 comprises the diameter of the portion of the valve body 32 wherein the disc valve 28 and accompanying spring 24 are placed and operate. The first inner diameter 40 of the valve body is designed to acconimodate displacement of the disc valve 28 from the valve seat 26 when the vent valve 14 is inserted into the valve body 32. Outer diameter of the disc valve 28 is designed to be sufficiently less than the first inner diameter 40 of the valve body 32 to permit flow of vapor and fluids through the inside of the valve body 32, past the disc valve 28 and through the vent windows 30 when the disc valve 28 is displaced and disengaged from the valve seat 26.

The second inner diameter 42 is formed at valve seat 26, and preferably extends along the portion of the valve body 32 towards the end of the valve body 32, wherein the vent valve 14 is inserted. The valve seat 26 comprises an inner concentric portion of the valve body 32 against which the valve disc 28 sealably resides when the shutoff valve 22 is in a closed position.

The vent housing 1 of the first embodiment is preferably a tubular-shaped thermoplastic device of a substantially circular cross-sectional area that is molded as an integral part of the modular reservoir assembly cover 12. A first end of the vent housing 1 is proximal to the modular reservoir assembly cover 12 and sealably attached thereto. A distal end of the vent housing 1 passes through the cover 12 and is within the fuel tank 5 when the cover 12 is assembled into the fuel tank 5. The distal end of the vent housing 1 is designed to receive the vent valve assembly 20. The vent port 16 is formed to pass through a wall of the vent housing 1 near the first end of the vent housing 1, external to the tank 5.

The vent housing 1 is designed to accept spring 24 recessed below the vent port 16. The disc valve 28 is assembled on top of the spring 24 inside the vent housing 1. The vent valve assembly is pressed into vent housing 1, with retention features 34 that engage the inner diameter of the vent housing 1. Valve body 32 has an open inner concentric portion in which the spring 24 and valve disc 28 reside. The spring 24 exerts compressive force upon the valve disc 28 and causes it to seal against the valve seat 26 of the valve body 32. The spring 24 is preferably a coil-shaped compression spring with a spring constant of sufficient force that the spring is operable to close the valve disc 28, and further operable to displace the vent valve 14 from the valve body 32 when the vent valve 14 is displaced greater than a predetermined amount, relative to longitudinal axis 99.

The shutoff valve 22 is preferably assembled to the vent housing 1 by placing the disc valve 28 onto the valve seat 26, and placing the spring 24 on the disc valve 28. The shutoff valve 22 is inserted into the vent housing 1 with the spring 24 interposed therebetween. The spring 24 is typically under compression, regardless of whether the vent valve 14 is inserted into the valve body 32. The disc valve 28 is in a normally closed position, with the disc valve 28 engaged against the valve seat 26, when the vent valve 14 is not inserted into the valve body 32, thus preventing substantially all fluid communication through the valve body 32.

Referring now to FIG. 3B, the shutoff valve 22 is operable to fluidly seal between the vent port 16 and the fuel tank 5 when a force greater than a threshold force acts upon the vent valve 14. The shutoff valve 20 is also operable to substantially fluidly seal the vent port 16 when the vent valve 14 is displaced greater than a predetermined amount, relative to longitudinal axis 99, when the vent valve 14 is displaced an amount sufficient to mechanically disconnect the vent valve from the cover 12, or when the vent valve 14 is subject to a force greater than a predetermined force.

The compression spring 24 exerts a closing force against the disc valve 28 when it is displaced by the vent valve 14. The closing force exerted against the disc valve 28 is directly transmitted to the first end 15 of the vent valve 14. Under normal operating conditions, the vent valve 14 is held in place in the shutoff valve 22 as a result of force exerted by the o-ring 48 between the first end 15 of the vent valve 14 and the shutoff valve 22, said force being sufficient to overcome the closing force exerted against the first end 15. Under certain conditions the vent valve may be subject to an action or force that displaces the vent valve, especially relative to the longitudinal axis 99 of the vent valve. When the displacement of the vent valve 14 exceeds a predetermined amount, the vent valve 14 likely rotates relative to the shutoff valve and the cover 12 and may break the fluid seal created by the o-ring 48. In this embodiment, when the vent valve 14 rotates more than approximately 10 degrees away from the longitudinal axis 99, it results in a displacement sufficient to begin disconnecting the vent valve 14 from the shutoff valve 22. Subsequently, the closing force exerted by the compression spring 24 against the disc valve 28 overcomes the retention force of the o-ring 48, causing the disc valve 28 to displace the first end of the vent valve 14, and closes the shutoff valve 22. Furthermore, the vent valve 14 may be subject to an action or force that substantially completely displaces the vent valve 14 relative to the shutoff valve. When the vent valve 14 is completely displaced, the shutoff valve 22 substantially completely closes, sealing the vent port 16.

Referring now to FIG. 4A, a second embodiment of the vent valve assembly 20' is shown. The second embodiment of a device for venting the tank 5, comprises cover 12' substantially closing an opening in the tank 5, valve housing 1' that is preferably molded into the cover 12' containing vent port 16 passing through the cover 12', a valve body 80 including shutoff valve 22' and vent valve 14', which is inserted into valve housing 1' and in fluid communication with the vent port 16. The vent valve 14' is contained in tank 5 and in fluid communication with the vent port 16 via shutoff valve 22'. The shutoff valve 22' is operable to substantially fluidly seal vent port 16 when the vent valve 14' is displaced greater than a predetermined amount, when the vent valve 14' is displaced an amount sufficient to mechanically disconnect the vent valve from the cover 12', or when the vent valve 14' is subject to a force greater than a predetermined force.

The modular reservoir assembly is preferably mounted in the fuel tank 5 such that main plane of cover 12' is in a horizontal orientation when the tank 5 is normally situated. Cover 12' comprises a rigid, substantially plate-shaped device formed of thermoplastic material, with openings for passage of fluids in and out of the tank 5 and mounting structures for attaching devices, including valve housing 1'. The vent valve assembly 20' is preferably assembled into the cover 12' such that a longitudinal axis 99 of the vent valve assembly 20' is vertical and perpendicular to the main plane of the cover 12'.

In the second embodiment, the cover 12' for the modular reservoir assembly (not shown) is interposed through the wall of the fuel tank 5, and is sealably attached thereto. The cover 12' preferably includes the vent housing 1' with vent port 16. The vent valve assembly 20', including the shutoff valve 22' and the vent valve 14', are assembled into valve body 80. The vent valve 14' is in fluid communication with the shutoff valve 22' which is in fluid communication with the vent port 16 fluidly connected to the external vent tube 18.

The cover 12' is modified to permit assembly of the valve body 80 thereto. A plurality of attachment clips 60 are preferably molded into the cover 12', orthogonal to the main plane of the cover 12', and facing into the tank 5 when the cover 12' is inserted therein. Each attachment clip 60 attaches to a corresponding opening 88 in the valve body 80 to hold the valve body 80 to the cover 12' after assembly and under normal operation. Each clip 60 is preferably oriented on a circle that is concentric to the longitudinal axis 99 of the opening in the cover for the housing 1' at a diameter sufficient to permit rigid attachment of the valve body 80 to the cover 12'. Each attachment clip 60 is frangible, i.e. capable of being broken. In this embodiment, each attachment clip 60 preferably includes a stress riser designed and intended to fracture when subject to a force greater than a predetermined force. Frangible attachment clips are known to one skilled in the art.

The valve body 80 preferably comprises a unitary thermoplastic molded component that is partially inserted into the vent housing 1'. The valve body 80 is rigidly attached to the cover 12' by inserting the plurality of attachment clips 60 into the plurality of openings 88 in plate 86 of the valve body 80. The valve body 80 comprises a first end 81 and a second end 82 joined at plate 86.

The first end 81 is preferably tube-shaped, circular in cross-section, with valve seat 26 formed proximal to plate 86 within the first end 81. Diameter of the first end 81 is sufficient to be sealably assembled within the valve housing 1'. An o-ring 90 is preferably inserted between the valve housing 1' and the first end 81 to create a fluid seal, such that there is no fluid communication between outside portion of the first end 81 of the valve body 80 and the valve housing 1'.

Shutoff valve 22' is created in the first end 81, and comprises disc valve 28' including plunger 29 proximal to valve seat 26, with compression spring 24 inserted in the first end 81 between disc valve 28' and housing 1'. The valve seat 26 is designed to interact with disc valve 28' to create a fluid seal when conditions allow.

The portion of the first end 81 above the valve seat 26 and proximal to housing 1' includes a plurality of vent windows 30' to permit fluid communication between inner portion of the valve body 80 and the housing 1', which is in fluid communication with the vent port 16. The first end 81 joins the plate 86 at junction 89, distal from the valve seat 26 and disc valve 28'. Junction 89 is preferably formed to include stress risers 62, rendering the junction 89 frangible. Design of a frangible junction in a plastic device is known to one skilled in the art.

Plate 86 is preferably disc-shaped, with the plurality of openings 88 preferably near the outer perimeter. A disc 66 is inserted into an opening of the plate 86 at the portion of the plate 86 that coincides with the first end 81. The disc 66 includes a plurality of openings 87 formed to permit fluid communication between the first end 81 and the second end 82 of the valve body 80. The plate has sufficient structure in this portion of the plate to engage plunger 29 attached to disc valve 28' and hold disc valve 28' open.

Second end 82 is tubular-shaped and projects a predetermined length into tank 5 when installed. Diameter of the second end is selected to interact with the vent valve assembly 20', which is sealably attached thereto, such that there is fluid communication through the vent valve assembly 20' to the first end 81.

Referring now to FIG. 4B, the shutoff valve 22' is operable to substantially fluidly seal the vent port 16 when the vent valve 14' is displaced greater than a predetermined amount, relative to longitudinal axis 99 of the vent valve, when the vent valve 14' is displaced an amount sufficient to mechanically disconnect the vent valve from the cover 12', or when the vent valve 14' is subject to a force greater than a predetermined force. In this embodiment, the disc valve 28' of shutoff valve 22' is held open by the interference between plunger 29 and plate 86.

When the vent valve 14' is displaced greater than a predetermined amount, the plurality of frangible attachment clips 60 fractures from the plate 86, and the first end 81 fractures at the frangible junction 89 between the plate 86 and second end 82, causing separation. When the plate 86 separates from the first end 81, the interference between plunger 29 and plate 86 is removed. The spring 24 causes the disc valve 28' to engage the valve seat 26, substantially completely closing the shutoff valve and sealing the vent port 16.

Although this is described with reference to a fill level vent valve in a fuel tank, it is understood that alternate embodiments of this invention may include other devices that pass through the wall of a fuel tank. This invention describes a valving system for use in conjunction with an existing tank vent valve that is known in the industry. As described previously, these valves may include, but are not limited to, fill limiter vent valves and grade vent valves (rollover valves). The cover 12' used by the vent valve assembly 20' of the instant invention may be installed in an upper surface of the tank 5, instead of being installed in the modular reservoir assembly cover as described hereinabove. The invention has been described with specific reference to the preferred embodiments and modifications thereto. Further modifications and alterations may occur to others upon reading and understanding the specification. Furthermore, specifications of various elements of component and system design, such as spring rates of springs, material selection, o-ring design, and component interference levels are to be determined based upon requirements related to application of the invention to a specific tank with valve system. The invention is intended to include all such modifications and alterations, and definition of specific elements insofar as they come within the defined scope.

Having thus describes the invention, it is claimed:

1. A device for venting a tank, comprising:
   a cover substantially closing an opening in the tank and comprising a valve housing;
   a vent port fluidly connected to the valve housing;
   a valve body inserted within the valve housing and defining a passage and comprising a valve seat circumferentially about the passage;
   a vent valve contained in the tank and comprising an neck having an end slidably received in the passage in the valve body so as to extend beyond the valve seat, said end comprising a plurality of vent windows;
   a shutoff valve supported within the vent body by said end spaced apart from said valve seat, said vent windows providing fluid communication between said passage and said vent port; and
   biasing means for urging the shutoff valve against the end and, upon displacement of the vent valve from the vent body, effective to urge the shutoff valve against the valve seat and thereby fluidly seal the vent port.

2. The device of claim 1, wherein the vent valve is frangibly connected to the cover.

3. The device of claim 1, wherein the vent valve further comprises a rollover protection valve.

4. The device of claim 1, wherein the vent valve is a fill limiter vent valve.

5. The device of claim 1 further comprising a seal formed between an outer surface of the neck and a surface of the passage.

6. The device of claim 5, wherein the seal is formed by an o-ring.

7. The device of claim 1, wherein the valve body comprises a plurality of retention devices and an o-ring that engage the valve housing to secure and fluidly seal the valve body within the valve housing.

* * * * *